United States Patent [19]
Helbig

[11] 4,275,787
[45] Jun. 30, 1981

[54] METHOD FOR MONITORING SUBSURFACE COMBUSTION AND GASIFICATION PROCESSES IN COAL SEAMS

[75] Inventor: Klaus Helbig, Zeist, Netherlands

[73] Assignee: Prakla - Seismos GmbH, Hanover, Fed. Rep. of Germany

[21] Appl. No.: 60,340

[22] Filed: Jul. 25, 1979

[30] Foreign Application Priority Data

Jul. 31, 1978 [DE] Fed. Rep. of Germany ....... 2833598

[51] Int. Cl.³ ...................... E21B 43/243; E21B 47/00
[52] U.S. Cl. ..................................... 166/251; 166/64; 166/65 R; 166/248
[58] Field of Search ............... 166/251, 252, 256, 259, 166/64, 248, 65 R; 48/DIG. 6; 250/253

[56] References Cited
U.S. PATENT DOCUMENTS

| | | | |
|---|---|---|---|
| 2,800,183 | 7/1957 | Jenkins | 166/251 |
| 3,775,073 | 11/1973 | Rhoades | 166/259 |
| 4,019,577 | 4/1977 | Fitch et al. | 166/259 |
| 4,120,354 | 10/1978 | Ridley et al. | 299/2 |
| 4,130,164 | 12/1978 | Datta | 166/259 |
| 4,140,180 | 2/1979 | Bridges et al. | 166/248 |
| 4,167,213 | 9/1979 | Stoltz et al. | 166/259 X |

FOREIGN PATENT DOCUMENTS 2702622  6/1978  Fed. Rep. of Germany .......... 166/251

OTHER PUBLICATIONS

Feder, "Infrared Sensing: New Way to Track Thermal Flood Fronts", World Oil, Apr. 1967, pp. 142, 145, 146, 149.

*Primary Examiner*—Stephen J. Novosad
*Attorney, Agent, or Firm*—Cooper, Dunham, Clark, Griffin & Moran

[57] ABSTRACT

A method for determining the location of a combustion front during subsurface combustion and gasification in a coal seam and of a change of electrical properties of the coal includes emitting radar signals from an elongated antenna. The antenna is located in a borehole within the coal seam. The radar signals are received and recorded for a determination of their travel time and amplitude.

5 Claims, 2 Drawing Figures

METHOD FOR MONITORING SUBSURFACE COMBUSTION AND GASIFICATION PROCESSES IN COAL SEAMS

BACKGROUND OF THE INVENTION

Field of the Invention

The present invention relates to monitoring methods in general and, more particularly, to monitoring subsurface combustion and gasification in a coal seam.

SUMMARY OF THE INVENTION

A method for determining the location of a combustion front during subsurface combustion and gasification in a coal seam and of a change of electrical properties of the coal includes emitting radar signals from an elongated antenna. The antenna is located in a borehole within the coal seam. The radar signals are received and recorded for a determination of their travel time and amplitude.

The objects and advantages of the invention will appear more fully hereinafter from a consideration of the detailed description which follows, taken together with the accompanying drawings, wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
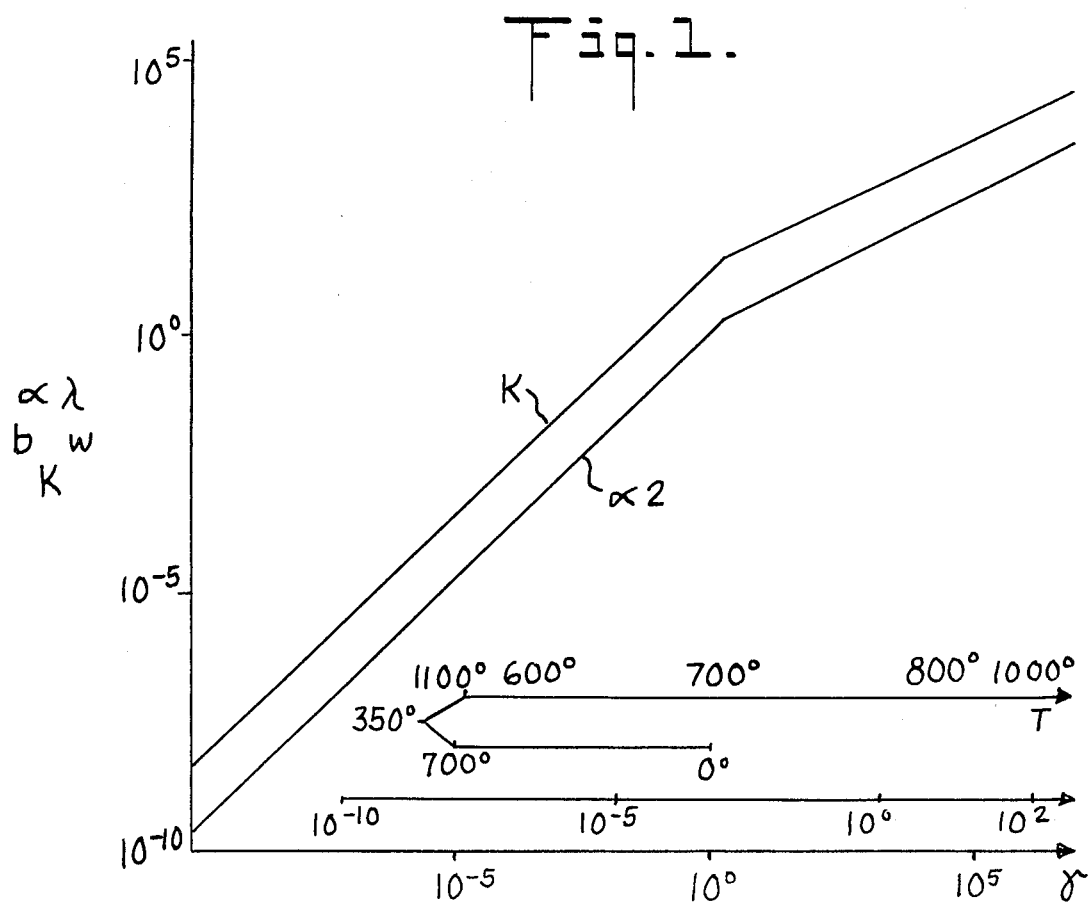
FIG. 1 is a graphic representation of the interrelation for the propagation of radar signals in coal, in accordance with the present invention, as a function of temperature.

A coal gasification process is particularly suitable for the recovery of coal below about 1000 to 1200 m, a depth which is practically the limit for conventional mining. According to this method, an injection well is drilled into a coal seam. Through this well, feed gas is injected which reacts with the coal in the seam in a chemical reaction, e.g. in an incomplete combustion. The resulting process gas migrates through fractures, which possibly further expand during the process, to several production wells which may be arranged in a circle around the injection well. The reaction front divides the coal seam into two parts: an inner part, roughly cylindrical, containing injection gas and process gas, and an outer part mainly consisting of the unchanged seam material which is fractured, however. The fractures also contain process gas which migrates to the production wells.

With this method, it is desirable that the critical process parameters should be monitored during the course of the reaction. This particularly applies to the location of the combustion front. In view of its inaccessibility and the high temperatures in the reaction area, direct measurement appears to be very difficult.

In a known method for determination of the location of the combustion front during subsurface combustion of an oil-bearing formation, impulses consisting of short electro-magnetic waves in the cm or mm range are emitted from the well from which combustion progresses into the formation. The impulses travel through an area which is practically free of oil to the combustion front and are reflected at the boundary region between the oil-free formation and an oil and water-bearing formation. The reflected impulses are received in the same or in a similar well and the time interval between the moment of impulse emission and the moment of impulse reception is measured and recorded. This method is based on the fact that the formation, after having become practically free of oil as a result of the reaction, shows a high transmissivity for said electromagnetic waves so that an adequate range of some 100 m is obtained in this oil-free area. Locating the source of the impulses in the injection well may be difficult—at least during the initial phase of the process—because of the high temperature there.

It is an object of the invention to render possible determination of the location of the combustion front and the amount of change of the electrical properties of the coal during combustion and gasification processes in coal seams.

The present invention solves this problem by emitting radar signals from an elongated antenna in a borehole within the same coal seam and receiving recording the and reflected radar signals for determination of their travel time and amplitude by at least one receiver antenna in a further borehole or by the transmitter antenna.

The method of this invention is based on the fact that the conductivity of coal is highly temperature-dependent. In the temperature range between 300° C. and 1000° C., for example, the conductivity of coal changes by about 9 orders of magnitude. After having travelled through the unchanged or merely fractured coal seam, the radar signal generated outside of the reaction area will therefore be reflected at a boundary region whose reflectivity is due to the large increase in conductivity caused by increased temperatures.

The following symbols are used in an explanation of the present invention.

$\alpha$ = absorption coefficient per unit of length
$\beta = 2\pi/\lambda$ = wave number
$\lambda$ = wave length
$\sigma$ = conductivity
$\epsilon$ = dielectric constant
$\mu$ = magnetic permeability
$\omega$ = angular frequency
$\dot{Z}$ = complex impedance
$\gamma = \sigma/\omega\epsilon$
k = reduction in amplitude per wave length in dB
K = relative dielectric constant Symbols without subscript refer to an undisturbed formation; symbols with subscript T refer to the combustion front.

The reflection coefficient Ref for plane electric waves incident perpendicularly on a plane combustion front, is $$\text{Ref} = (\dot{z}_T - \dot{z})/(\dot{z}_T + \dot{z}) \tag{1}$$

Here the complex impedance is the ratio of the magnetic to the electric field component in the progressive wave.

Assuming that $\mu$ and $\xi$ are far less temperature-dependent than $\sigma$, the reflection factor can be expressed as follows:

$$\text{Ref} = (k - k_T)/[(k+k_T) + (j)(80 - \pi/|n|0)] = (k-k_T)/[k+k_T+(j)(109.13)] \quad (2)$$

where $j = \sqrt{-1}$, i.e. the imaginary part of a complex number.

Hence it follows that the reflection coefficient is greater than 0.7, if the reduction in amplitude per wave length in the combustion front exceeds 100 dB. In the undisturbed seam, the reduction in amplitude per wave length amounts to a few dB, e.g. 1 dB for Pittsburgh coal and 3 dB for British coal.

By means of the relation $k = 20\alpha\lambda/\ln 10$, and with $\epsilon = 10^3$ S/m, $\epsilon = K \cdot 10^{11}$ and $\omega = 10^8$, where $S = 1/\Omega$, the unit of conductivity; it can be shown that $$k \approx 800 \text{ dB}/\lambda \quad (3)$$

The reflection factor Ref is thus of the order of magnitude 1. With reference to FIG. 1, three temperature intervals are of interest in connection with this problem:

temperature below 100° C., $\sigma \approx 10^{-3}$ S/m, $\gamma \approx 1$
temperature above 100° C., $\sigma \approx 10^{-7} - 10^{-9}$ S/m, $\gamma << 1$
temperature $\approx 1000°$ C., $\sigma \approx 10^3$ S/m, $\gamma \approx 10^3 - 10^5$ For each of the three intervals, $\alpha\lambda$ can be approximated with good accuracy by means of a simple expression:

$\gamma = 1 + \delta, |\delta| << 1, \alpha\lambda \approx 0.332 + 1.724\gamma$
$\gamma << 1, \alpha\lambda \approx 2.22\gamma$
$\gamma >> 1, \alpha\lambda = 3.14 \sqrt{\gamma}$ For the three intervals, the reduction in amplitude per wave length is thus as follows:

$k_{20} \approx 10$ dB–18 dB
$k_{150} \approx 0.02$ dB–0.2 dB
$k_{1000} \approx 100$ dB–1000 dB.

The range of the measurements is fixed in that the wave reflected by the target must still be detectable. The ratio of maximum transmitted energy to the just detectable energy of the reflection is called PF (Performance Figure). Underground radars show PF values of 100 dB–110 dB, with values of 200 dB–230 dB being considered obtainable. The range is a function of distance R and radius of curvature R where R = distance transmitter—combustion front, and r = the radius of curvature of the combustion front.

With a wave length of 1.0 m and a reservoir temperature of 60° C., $k \approx 0.003$ dB/m. If $R/r = 300$, a range of more than 100 m is obtained for a PF of 100 dB. Thus a sufficient range is achieved.

The $\sigma$ values plotted in FIG. 1 were determined experimentally. The $\gamma$ values were calculated for 16 MHz corresponding to $\pi = 18$ m.

Figure 2:
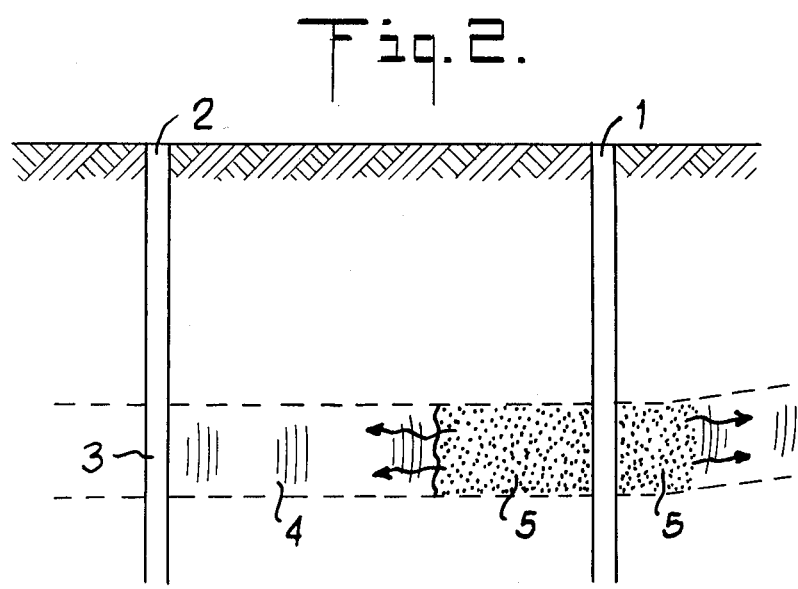
FIG. 2 is a schematic of a vertical section of an earth formation having a coal seam and boreholes for practising the present invention.

FIG. 2 shows the reservoir with the injection well 1, the measuring and observation well 2, the transmitting/receiving equipment 3 for radar signals installed therein, the coal seam 4, and the reaction area 5 which spreads in the direction of the arrows. From the transmitting/receiving equipment 3, the radar signals travel through the mainly undisturbed and fractured coal seam 4 to the combustion front limiting the reaction area 5, from where, on account of the strong change in conductivity, they are reflected to the transmitting/receiving equipment 3. They are then recorded and analyzed with regard to travel time and amplitude. The equipment receiving the radar signals can alternatively or additionally be installed in one or more further boreholes.

For processing the recorded signals it is advisable that a plurality of signals be superimposed with the same polarity and synchronously to form a summation signal, the signals being received with an insignificant time difference compared with the progress of the subsurface process. An increase in range is thus obtained.

It is also advisable that sweep signals be transmitted in place of sharp radar impulses; they consist of long separate impulses, essentially sinusodal, whose instantaneous frequency varies in a strictly monotonous way between an upper and a lower frequency limit. The received sweep signals are stacked, if required, and are then cross-correlated with the transmitted sweep signal in a well known manner.

To eliminate or at least largely suppress signals which are not caused by the process to be monitored, it is also advisable that signals be generated successively with a time difference ensuring that the subsurface process has changed significantly from one signal emission to the next so that, for example, the reaction front has spread during this interval by at least the dominant or medium wave length of the transmitted signal. Signals generated with such a time difference are superimposed with reversed sign to form a difference signal. Reflections not coming from the reaction front but from other reflectors which are not related to the reaction, are thus eliminated so that only the difference of the signals coming from the reaction front is left. If receiver and transmitter are not installed in the same place, the direct wave is also eliminated by the formation of the difference. The difference signal can then be processed as indicated above, by stacking, cross-correlation, etc.

What is claimed is:

1. A method for monitoring subsurface combustion and gasification processes in coal seams for the determination of the location of the combustion front and the amount of change of the electrical properties of coal during combustion and gasification comprising the steps of emitting radar signals from an elongated antenna in a borehole within the same coal seam, and recording the radar signals for a determination of their travel time and amplitude by at least one receiver antenna in a further borehole or by the transmitter antenna.

2. A method according to claim 1, characterized in that signals, generated with significant time difference compared with the progress of the subsurface process, are superimposed with reversed sign for determination of travel time and amplitude values of the difference signal which depend on changes within the measuring region.

3. A method according to claim 1 or 2, characterized in that, in order to increase the range, a plurality of separate signals which are transmitted with an insignificant time difference compared with the progress of the subsurface process are superimposed with the same polarity and synchronously, after recording and prior to further processing to form a summation signal.

4. A method according to claim 3 characterized in that long, essentially sinusoidal signals are transmitted whose instantaneous frequency varies in a strictly monotonous way between an upper and a lower frequency limit, and that either the recorded signals prior to the superimposition leading to the formation of a difference signal, or the difference signal are cross-correlated with the transmitted signal.

5. A method according to claim 2 characterized in that long, essentially sinusoidal signals are transmitted whose instantaneous frequency varies in a strictly monotonous way between an upper and a lower frequency limit, and that either the recorded signals prior to the superimposition leading to the formation of a difference signal, or the difference signal are cross-correlated with the transmitted signal.

* * * * *

UNITED STATES PATENT AND TRADEMARK OFFICE
CERTIFICATE OF CORRECTION

PATENT NO. : 4,275,787
DATED : June 30, 1981
INVENTOR(S) : Klaus Helbig

It is certified that error appears in the above-identified patent and that said Letters Patent are hereby corrected as shown below:

Col. 2, line 24, "receiving recording" should be -- receiving and recording --.

Col. 2, line 25, "and reflected" should be -- reflected --.

Col. 3, line 41, "curvature R" should be -- curvature r --.

Col. 3, line 50, "$\pi$" should be -- $\lambda$ --.

Signed and Sealed this

First Day of September 1981

[SEAL]

Attest:

Attesting Officer

GERALD J. MOSSINGHOFF

Commissioner of Patents and Trademarks